United States Patent
Burow et al.

(10) Patent No.: US 9,827,866 B2
(45) Date of Patent: Nov. 28, 2017

(54) VEHICLE CONTROL SYSTEM FOR AN AT LEAST PARTIALLY ELECTRICALLY OPERATED VEHICLE

(71) Applicant: Audi AG, Ingolstadt (DE)

(72) Inventors: Clemens Burow, München (DE); Florian Then, Ingolstadt (DE)

(73) Assignee: Audi AG, Ingolstadt (DE)

( * ) Notice: Subject to any disclaimer, the term of this patent is extended or adjusted under 35 U.S.C. 154(b) by 30 days.

(21) Appl. No.: 14/912,354

(22) PCT Filed: Jul. 30, 2014

(86) PCT No.: PCT/EP2014/002084
§ 371 (c)(1),
(2) Date: Feb. 16, 2016

(87) PCT Pub. No.: WO2015/024623
PCT Pub. Date: Feb. 26, 2015

(65) Prior Publication Data
US 2016/0200210 A1     Jul. 14, 2016

(30) Foreign Application Priority Data
Aug. 21, 2013  (DE) .................. 10 2013 013 953

(51) Int. Cl.
*B60L 11/18*     (2006.01)
*B60W 10/26*     (2006.01)
(Continued)

(52) U.S. Cl.
CPC ............ *B60L 11/1861* (2013.01); *B60K 1/00* (2013.01); *B60K 1/02* (2013.01); *B60K 17/356* (2013.01);
(Continued)

(58) Field of Classification Search
CPC ...... B60W 10/08; B60W 20/13; B60W 10/26; B60W 20/10; B60W 2510/244;
(Continued)

(56) References Cited

U.S. PATENT DOCUMENTS 5,508,924 A * 4/1996 Yamashita ........... B60K 7/0007
180/197
7,739,005 B1 * 6/2010 Tang ......................... B60L 3/10
701/22
(Continued)

FOREIGN PATENT DOCUMENTS

| CN | 101450666 A | 6/2009 |
| CN | 102529949 A | 7/2012 |

(Continued)

OTHER PUBLICATIONS

International Search Report issued by the European Patent Office in International Application PCT/EP2014/002084 dated May 4, 2015.
(Continued)

*Primary Examiner* — Bao Long T Nguyen
(74) *Attorney, Agent, or Firm* — Henry M. Feiereisen LLC

(57) ABSTRACT

A drive device of an at least partially electrically operated vehicle includes at least two vehicle wheels, each wheel being mechanically coupled to an electrical drive unit. Each electrical drive unit obtains electrical energy from an electrical energy storage device during motor operation, and/or supplies the electrical energy storage device with electrical energy during generator operation. When operating as intended, the electrical drive units provide a torque according to a drive-unit-specific torque of a vehicle control system. A maximum total torque is determined by taking into consideration a maximum available output of the electrical energy storage device, wherein the sum formed of the
(Continued)

drive-unit-specific torques is limited using the maximum total torque.

13 Claims, 2 Drawing Sheets

(51) Int. Cl.
| | |
|---|---|
| B60W 20/10 | (2016.01) |
| B60W 10/08 | (2006.01) |
| B60K 1/02 | (2006.01) |
| B60L 15/20 | (2006.01) |
| B60K 1/00 | (2006.01) |
| B60K 17/356 | (2006.01) |
| B60L 3/00 | (2006.01) |
| B60L 8/00 | (2006.01) |
| B60L 11/00 | (2006.01) |
| B60L 1/00 | (2006.01) |
| B60W 20/13 | (2016.01) |

(52) U.S. Cl.
CPC .............. *B60L 1/003* (2013.01); *B60L 3/0046* (2013.01); *B60L 8/003* (2013.01); *B60L 11/005* (2013.01); *B60L 11/1851* (2013.01); *B60L 11/1859* (2013.01); *B60L 11/1881* (2013.01); *B60L 15/2045* (2013.01); *B60W 10/08* (2013.01); *B60W 10/26* (2013.01); *B60W 20/10* (2013.01); *B60W 20/13* (2016.01); *B60K 2001/001* (2013.01); *B60L 2220/42* (2013.01); *B60L 2240/423* (2013.01); *B60W 2510/244* (2013.01); *B60W 2710/083* (2013.01); *Y02T 10/645* (2013.01); *Y02T 10/648* (2013.01); *Y02T 10/705* (2013.01); *Y02T 10/7022* (2013.01); *Y02T 10/7083* (2013.01); *Y02T 10/72* (2013.01); *Y02T 10/7283* (2013.01); *Y02T 10/84* (2013.01); *Y02T 90/34* (2013.01); *Y10S 903/907* (2013.01)

(58) Field of Classification Search
CPC ..... B60W 2710/083; B60K 1/00; B60K 1/02; B60K 17/356; B60K 2001/001; B60L 1/003; B60L 3/0046; B60L 8/003; B60L 11/005; B60L 11/1851; B60L 11/1859; B60L 11/1881; B60L 15/2045; B60L 2220/42; B60L 2240/423; B60L 15/2036; Y02T 10/645; Y02T 10/648; Y02T 10/7022; Y02T 10/705; Y02T 10/7083; Y02T 10/7283; Y02T 90/34; Y10S 903/907
USPC .................................................. 701/22, 69
See application file for complete search history.

(56) References Cited

U.S. PATENT DOCUMENTS

| | | | |
|---|---|---|---|
| 2006/0016630 A1* | 1/2006 | Yang .................... | B60K 7/0007 180/65.1 |
| 2010/0222953 A1* | 9/2010 | Tang ................... | B60L 15/2036 701/22 |
| 2012/0208671 A1* | 8/2012 | Zhu ........................ | B60K 6/387 477/5 |
| 2013/0204473 A1 | 8/2013 | Then et al. | |
| 2014/0163803 A1* | 6/2014 | Kamatani .............. | B60K 6/445 701/22 |
| 2014/0228166 A1* | 8/2014 | Heap ..................... | B60W 20/00 477/5 |
| 2015/0175010 A1* | 6/2015 | Tang ........................ | B60L 3/12 701/22 |

FOREIGN PATENT DOCUMENTS

| | | |
|---|---|---|
| DE | 694 14 451 | 7/1999 |
| DE | 102004046194 | 6/2005 |
| DE | 102010021352 | 11/2011 |
| DE | 102011004862 | 8/2012 |
| DE | 102011005962 | 9/2012 |
| DE | 102011119207 | 5/2013 |

OTHER PUBLICATIONS

Chinese Search Report issued by the Chinese Patent Office in Chinese Application No. 2014800462808 dated Jun. 26, 2017.
English translation of Chinese Search Report issued by the Chinese Patent Office in Chinese Application No. 2014800462808 dated Jun. 26, 2017.

* cited by examiner

VEHICLE CONTROL SYSTEM FOR AN AT LEAST PARTIALLY ELECTRICALLY OPERATED VEHICLE

CROSS-REFERENCES TO RELATED APPLICATIONS

This application is the U.S. National Stage of International Application No. PCT/EP2014/002084, filed Jul. 30, 2014, which designated the United States and has been published as International Publication No. WO 2015/024623 and which claims the priority of German Patent Application, Serial No. 10 2013 013 953.8, filed Aug. 21, 2013, pursuant to 35 U.S.C. 119(a)-(d).

BACKGROUND OF THE INVENTION

The present invention relates to a method for controlling a drive device of at least one partially electrically driven vehicle, having at least two vehicle wheels mechanically coupled by way of respective electric drive units, wherein the electric drive units each receive electrical energy during motor operation from an electrical energy storage device and/or supply electric energy during generator operation to the energy storage device, wherein the electric drive units provide in normal operation a torque in accordance with an drive-unit-specific target torque of a vehicle control system. The invention further relates to a vehicle control system and a vehicle with the vehicle control system.

Vehicles of the generic type are known in principle, so that a specific documentation is not required. Vehicles, also known as motor vehicles, are used to travel on land. When in addition to an electric machine as a drive, a combustion engine is additionally provided as a drive, these vehicles are usually referred to as hybrid vehicles. A vehicle having a drive device composed exclusively of one or more electric machines is typically referred to as an electric vehicle. The electric machines used for generic vehicles can usually be rotating electric machines, for example, a DC machine, a three-phase machine, or the like.

For driving operation, the electric machine(s) is/are electrically connected to a battery of the vehicle. The battery is generally designed as a high-voltage battery and supplies a maximum current, which can be consumed by the electric machines. A portion of this maximum electric current is transmitted to the respective electric machine. A controller associated with the respective electric machine computes from the value of this current a minimum or maximum torque that can be attained by the respective electric machine by supplying this maximum current. These maximum torques determined from the power provided to the electric machines are transmitted to a vehicle control system of the vehicle.

By using the vehicle control system, a drive target torque set by a driver of the vehicle is divided among the available electric machines in accordance with the maximum torques of the electric machines. This ensures that the maximum current of the vehicle battery is not exceeded, thus preventing an impermissible operating state of the vehicle battery. Although this approach has proven effective, it is disadvantageous that individual electric machines cannot be operated above their assigned power, even if the vehicle battery can still provide energy reserves. In addition, the vehicle control system does not have a feedback from the respective inverter with respect to the torque setting range that is actually available. Both the inverter and the electric machine can typically be operated at least temporarily at a higher power than the assigned power.

SUMMARY OF THE INVENTION

It is thus the object of the invention to better use the power provided by the vehicle battery.

As a solution, the invention proposes a method according to claim 1 and a vehicle control system according to claim 9, and a vehicle according to claim 10. Further advantageous embodiments result from the features of dependent claims.

In particular, the invention proposes a method for controlling a drive device having at least two vehicle wheels of a vehicle which are each coupled to a respective electric drive unit, wherein the electric drive units receive during motor operation electrical energy from an electrical energy storage device and/or supply during generator operation electric energy to the energy storage device, wherein the electric drive units provide in normal operation a torque in accordance with drive-unit-specific target torque of a vehicle controller, wherein a maximum total torque is determined by taking into account a maximum available power of the electric energy storage device and wherein a sum formed from the drive-unit-specific target torques is limited by the maximum total torque.

In addition, the drive units may each transmit their maximum adjustable torque to the vehicle controller, so that maximum values for the drive-unit-specific target torques are determined not only by taking into account a maximum power available from the electric energy storage device, but additionally also the maximum torques of the drive units.

The invention thus moves away from the principle of the fixed power assignment to the respective electrical drive units. The drive unit typically includes at least one electric machine, which is preferably designed as a rotating electric machine. In addition, the drive unit may include a converter to which the electric machine is connected. Furthermore, the drive unit may have its own controller.

The maximum total torque thus forms a comparison value which is used to compare the sum formed from drive-unit-specific target torques. In this way, the sum of the drive-unit-specific target torques can be limited so as not to exceed the maximum available power from the electrical energy storage device. At the same time, each of the drive units can be operated within a wide range wherein, for example, a first drive unit provides its maximum possible torque. At the same time, another drive unit can provide a torque such that a difference between the power required for the first drive unit and the maximum available power is not exceeded, unless the first drive unit alone already claims the maximum available power. The power distribution of the maximum available power can be made substantially arbitrarily by observing the constraint of the maximum available power. Optionally, the maximum adjustable torques of the drive units or corresponding powers can be considered as further boundary conditions.

According to one aspect of the invention, the maximum values for the machine-specific target torques associated with the respective drive units or the electric machines or converters may be variable, and preferably such that the maximum power available from the electrical energy storage device is not exceeded. Here, the maximum power available from the electrical energy storage device may be a maximum supplied power and a maximum received power input of the energy storage device. The invention thus makes it possible to largely independently set the drive-unit-specific target torques. In particular, the user-side drive-unit-specific target torque can be freely divided over the drive-unit-specific target torques in a wide range. Only the maximum power of the electrical energy storage device must be considered as a boundary condition.

The electric drive units can be operated during motor operation as well as during generator operation. Such electric machines can be, for example, DC motors, three-phase motors or the like.

The vehicle wheels may be provided at one, two or more axles of the vehicle. In general, the vehicle has at least two axles, each having at least one wheel. In a single-track vehicle, a single wheel is, for example, provided on each of the two axles. In such a case, the drive unit, in particular, the electric machine, may preferably be formed as a hub machine, i.e. the drive unit is integrated in the vehicle. However, of course, a two- or multi-track vehicle may also be provided. In a two-track vehicle, for example, at least two axles may be provided, wherein a vehicle wheel is provided at each end on both sides of each axle. Preferably, the vehicle wheels of an axle are commonly driven by an electric machine. In addition, however, two or more of the vehicle wheels in a multi-track vehicle may be driven, preferably individually, by hub machines.

The electrical energy storage device is, for example, formed of an accumulator, a capacitor, in particular a super cap, combinations thereof or the like. in addition, the electrical energy storage device may also include control means configured to control the distribution of electric energy within the electrical energy storage device. The electrical energy storage device further includes communication means for transmitting at least one value of the maximum available power. This value may be dependent on at least one parameter of the electrical energy storage device and be determined repeatedly. The parameter may include a temperature, a capacity, an aging condition, an electrolyte density, combinations thereof or the like. The value for the maximum available power is transmitted to the vehicle control system.

The electrical energy storage is thus preferably chargeable, so that it can receive and store electrical energy generated by the electric drive units during braking.

A user can specify for the vehicle control system a drive target torque input via an input device, such as a pedal or the like. The drive target torque can also be specified by a speed control or the like. Based on the drive target torque, the vehicle control system generates drive-unit-specific target torques which are transmitted to the respective drive units, such as the electric machinery or their converters.

A drive-unit-specific target torque is a target torque of the vehicle control system for an electric drive unit that should produce the drive-unit-specific target commensurate with the target torque of the vehicle control system. The target torque can be both a target torque that accelerates the vehicle and a target torque that slows the vehicle down. Accordingly, the electric drive unit is operated during motor operation or during generator operation. In this way, not only can an acceleration of the vehicle be realized with the drive device, but also a deceleration, so that the electrical energy generated by the deceleration can be used for recuperation purposes.

Unlike in the prior art, in the invention, the maximum value for the drive-unit-specific target torques is largely freely determined by taking into account of the maximum available power of the electric energy storage device. Preferably, the determination is made by computing a mathematical sum of the maximum available values for the drive-unit-specific target torques so that the sum does not exceed the maximum power available from the electrical energy storage device. That is, the vehicle control system can vary the respective maximum values for the drive-unit-specific target torques in a wide range and, for example in dependence of a respective operating state of the vehicle. For example, during acceleration of the vehicle, the maximum values for the drive-unit-specific target torques for a front axle may be selected to be smaller than for a rear axle. The reverse maximum values may be selected during deceleration of the vehicle. Overall, with the invention, the respective electrical drive unit can be operated with higher power than in the prior art, thus significantly enhancing the driving dynamics of the vehicle.

In contrast to the prior art, the invention does not require to first transmit to the drive units values for the maximum power, wherein the drive units then determine with these values their maximum torques which are then transmitted back to the vehicle control system. With the invention, the vehicle control system does not need to transmit any power values to the drive units, and instead receives values for the respective maximum torques from the drive units independent of any power available for each inverter. These values for the maximum torques are therefore substantially drive-unit-specific, i.e., they may depend inter alia on the design, construction, environmental conditions, such as ambient temperature, and/or the like. These values may also be a fixed value for each respective drive unit. Therefore, the vehicle control system can thus distribute the maximum available power in a range which significantly by far exceeds the possibilities, in particular the adjusting range, of the prior art.

Accordingly, the invention provides a vehicle control system of an at least partially electrically driven vehicle for controlling at least two vehicle wheels mechanically coupled by a respective electric drive unit of a drive device, with at least one terminal for connecting the electric drive units, wherein the vehicle control system is configured to provide to each of the electric drive units in the intended operating a drive-unit-specific target torque, wherein the vehicle control system includes a computing unit which is configured to determine a maximum total torque by taking into account a maximum available power of the electric energy storage device, and to limit by way of the maximum total torque a sum formed from the drive-unit-specific target torques. The vehicle controller is in particular set up to execute the method according to the invention.

The invention also proposes a vehicle with a drive having at least two vehicle wheels mechanically coupled by a respective electric drive unit, wherein the electric drive units are connected to the electrical energy storage device for receiving electrical energy from an electrical energy storage device during motor operation and/or for supplying electrical energy to the electric energy storage during generator operation. The vehicle has a vehicle control system of the invention. In particular, the vehicle control system is configured to perform the method of the invention. In addition, the vehicle control system is preferably configured to provide to each of the electric drive units in normal operation a drive-unit-specific target torque.

Accordingly, the foregoing discussions regarding the method are also applicable to the vehicle controller and to the vehicle according to the invention.

According to another embodiment of the invention, the maximum values of the drive-unit-specific target torques are adjusted when the maximum available power changes. The maximum available power can change due to changes in the internal parameters the electrical energy storage device, such as its capacity, caused by environmental effects, for example the ambient temperature or the like. The change can also be caused by a variation of internal characteristics of the electrical energy storage device, for example, an internal resistance, temperature monitoring or the like. These changes in the parameters can cause a change of the maximum available power of the electric energy storage device.

The maximum available power can be either a maximum available power to be supplied and/or a maximum available power to be received. Preferably, the vehicle control system is communicatively connected to the electrical energy storage device and thus has current information relating to the value of the maximum available power of the electric energy storage device. On the basis of this current value, the vehicle control system computes the maximum values for the drive-unit-specific target torques, preferably depending on a desired driving state. The vehicle control system then determines or computes the drive-unit-specific target torques for the current driving state of the vehicle by taking into account these parameters.

According to a further development, the maximum value for the drive-unit-specific target torques may be determined by taking into account an efficiency of the electric drive units, in particular of the electric machine and/or of an inverter associated with the respective electric machine. Here, it is assumed that the determined maximum value for the drive-unit-specific target torque can actually be provided by the corresponding electric drive unit. Preferably, the electric drive unit is designed accordingly. The accuracy can be improved by considering the efficiency. Preferably, the corresponding efficiency is transmitted to the vehicle control system by the electric machine and/or by the inverter associated with the corresponding electric machine. This has the advantage that the current required efficiency is always available to the vehicle control system which can then perform the computation on that basis. Moreover, a change in efficiency can be taken into account, for example, when the efficiency of the electric machine and/or optionally also of the associated inverter is not constant over the entire operating range, for example changes depending on the torque to be set. This can further enhance the accuracy.

According to a further embodiment, it is proposed that the vehicle controller assigns to each of the electric drive units a maximum electric power under the proviso that a sum of the assigned maximum electrical power is limited by the maximum power available from the electrical energy storage device. This can ensure that the electrical energy storage device is, on the one hand, not overloaded and that, on the other hand, the available power of the electric energy storage device is distributed freely and flexibly to the respective electrical drive units. This can improve the operational safety of the electrical energy storage device on the electrical side.

In a further embodiment, the vehicle control system may determine maximum values for the drive-unit-specific power of the drive units by taking into account the drive-unit-specific target torques and transmit the same to the drive units. The electric drive units can thereby adapt their own monitoring functions, thereby preventing overloading of the electrical energy storage device.

According to a further aspect of the invention, the vehicle control system may take into account for determining the maximum value for the drive-unit-specific target torque a power of an electrical component connected to the electrical energy storage device. The electrical component can be an electrical load such as vehicle lighting, air conditioning of the vehicle or the like, but also be a source of energy, for example, a solar cell, a fuel cell, combinations thereof or the like. In this respect, the power can have a positive value as well as a negative value. By taking into consideration the connected electrical component, the reliability and dynamic operation of the vehicle controller can be further improved and the adjustment range for the torques of the electric drive units may optionally be expanded.

According to a further development, it is proposed that the electrical component is switched on or switched off to increase the maximum available power. In this way, the range for the vehicle dynamics can be further improved by extending the coverable range of the maximum power available by the electric energy storage device. If, for example, a delay is increased, then in addition an electrical consumer, for example, the lighting of the vehicle or the air conditioning system may be switched on to increase the power available for the delayed operation. Similarly, a fuel cell can be activated to increase acceleration.

According to another embodiment of the invention, the maximum available power may be determined depending on a state of charge and/or an aging state of the electric energy storage device. Changes in the maximum available power of the electric energy storage device, which may depend, for example, on the state of charge or the aging state, may be taken into account by the vehicle control system for the method for controlling the driving of the vehicle. This further improves the reliability.

BRIEF DESCRIPTION OF THE DRAWING

Further advantages and features will become apparent from the following description of an exemplary embodiment with reference to two figures. In the figures, identical reference numerals designate identical components and functions.

It is shown in.

DETAILED DESCRIPTION OF PREFERRED EMBODIMENTS

Figure 1:
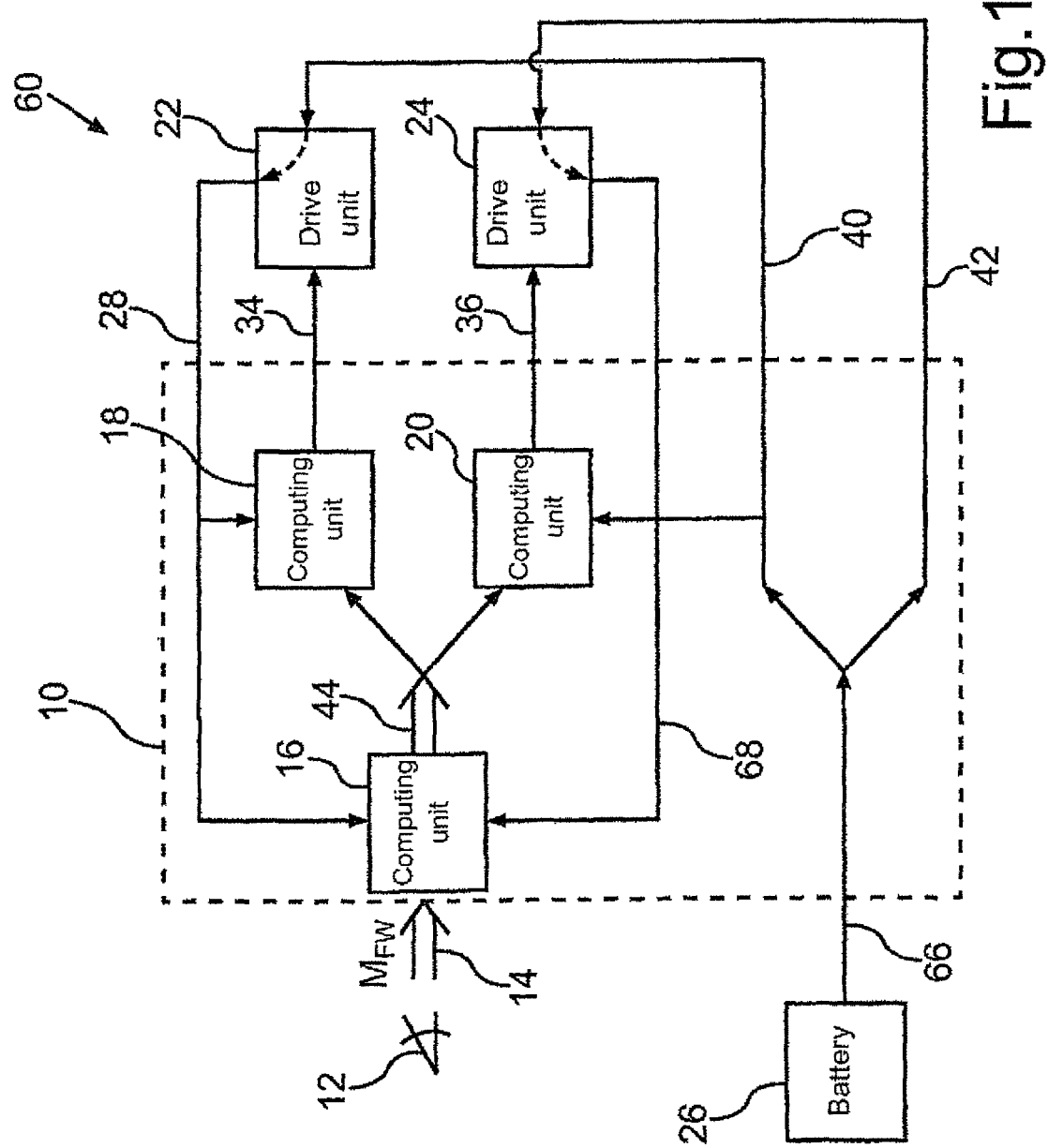
FIG. 1 a schematic block diagram of a drive device for an electrically powered vehicle according to the prior art, and FIG. 2 a schematic block diagram of a drive device of a vehicle according to the invention.

FIG. 1 shows in a schematic block diagram a drive device 60 of an unillustrated vehicle, which can be electrically driven by two electrical drive units 22, 24 which include (also unillustrated) electric machines. The electric machines are designed as rotating electric machines, in particular in the present example as three-phase machines. Accordingly, the drive units 22, 24 include converters in form of inverters to electrically couple the electric machine to a DC-link circuit. For the exemplary embodiment, the vehicle includes two driven axles, each with two wheels at the respective ends of the axles, wherein each axle can be driven one of the two electrical drive units 22, 24 and their electric machines, respectively. To this end, the electric machines are mechanically coupled with the respective axles.

Each of the two electric machines is connected to an accumulator 26 of the vehicle by way of an inverter associated with the drive units 22, 24, which at the same time also provides the intermediate circuit, thus enabling exchange of electrical energy between the respective electric machine and the accumulator 26.

The accumulator 26 is communicatively connected to a vehicle control system 10 and transmits its maximum available power 66 to the vehicle control system 10. The power 66 can be either a maximum power to be received or a maximum power to be supplied. In general, the maximum power to be received and the maximum power to be supplied have the same magnitude. In another embodiment, however, different values may be provided for the maximum power to be received and the maximum power to be supplied. In this case, of course, two values for a maximum available power are the transmitted to the vehicle control system 10.

The vehicle control system 10 detects the value of the maximum available power 66 and generates therefrom two maximum powers 40, 42 for the respective drive units 22, 24, wherein the corresponding values for the maximum powers 40, 42 are transmitted to the respective drive units 22, 24. The drive units 22, 24 adjust their operation such that the respective drive unit 22, 24 do not exceed the respectively assigned maximum power 40, 42.

The drive units 22, 24 determine from the respectively associated maximum powers 40, 42 corresponding maximum torques 28, 68, which they can supply in each case to the respective connected electric machine based on the respective maximum power 40, 42. The maximum torques 28, 68 are transmitted to the vehicle control system 10.

The vehicle control system 10 is further connected to a pedal 12, with which a driver of the vehicle can set a drive target torque. The drive target torque 14 is transmitted from the pedal 12 to the vehicle control system 10.

In a first computing unit 16 of the vehicle control system 10 which receives the drive target torque 14, a total target torque 44 is generated by taking into account the respective maximum torques 28, 68 of the drive units 22, 24. The total target torque 44 is supplied, split evenly, to the computing units 18, 20 associated with the respective drive units 22, 24. The computing units 18, 20 generate therefrom, by taking into account the respective maximum torques 28, 68, drive-unit-specific target torques 34, 36 which are then transmitted to the respective drive units 22, 24. The drive units 22, 24 then provide the corresponding torque via the electric machine connected thereto in accordance with the drive-unit-specific target torques 34, 36. The axles of the vehicle are driven accordingly.

Although the prior art embodiment has proven to be effective, the fixed-ratio division of the maximum available power of the accumulator 26 to the respective drive units 22, 24 is disadvantageous and limits the driving dynamics.

Figure 2:
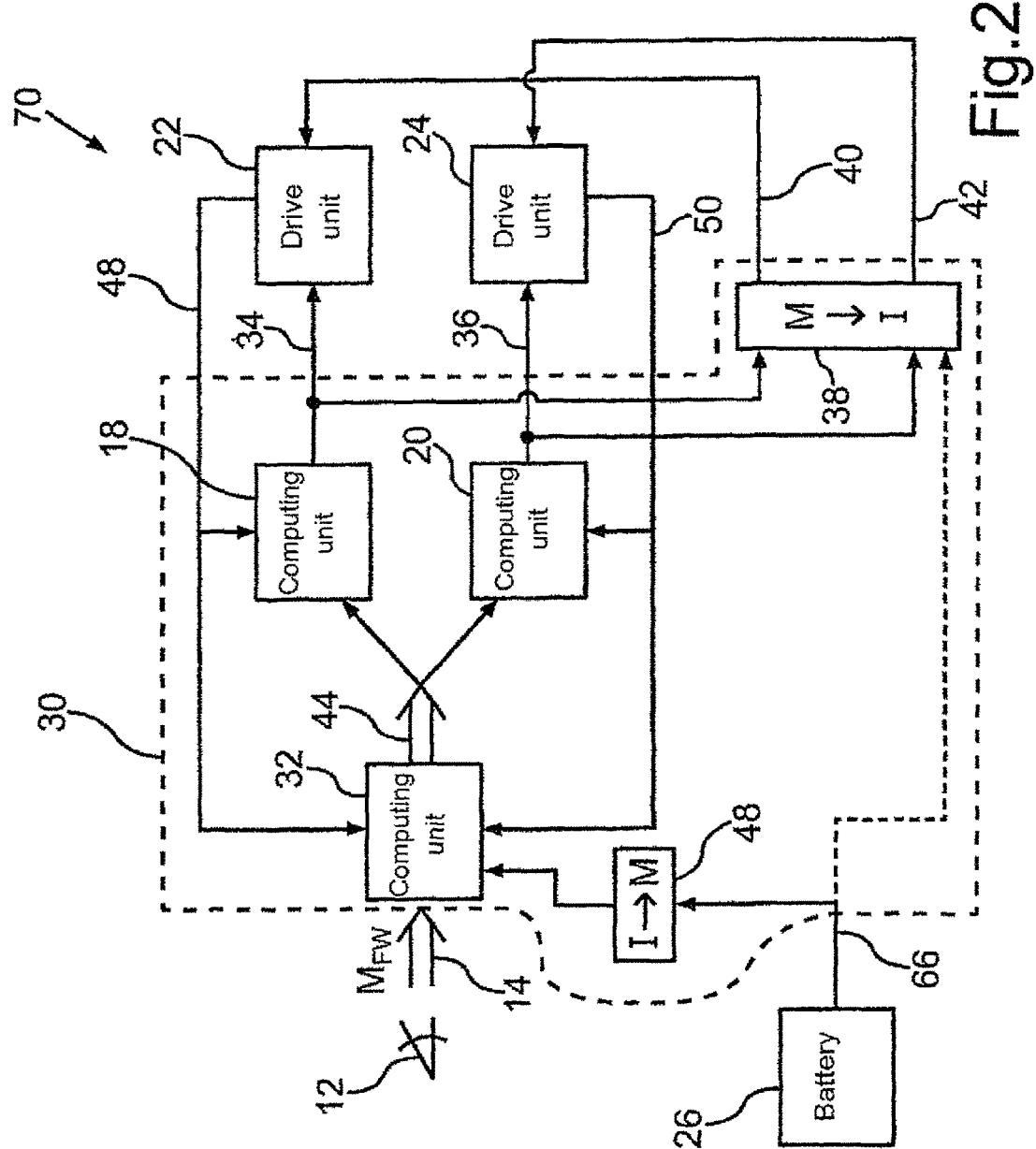

The invention provides a remedy. This is illustrated by the exemplary embodiment of the invention shown in FIG. 2. The exemplary embodiment of FIG. 2 is based on the prior art, as described with reference to FIG. 1. Therefore, reference is made to these descriptions.

The invention according to FIG. 2 differs from the prior art in that the maximum available power 66 of the accumulator 26 is no longer distributed to the respective drive units 22, 24 split with a fixed-ratio, for example equally, as in the embodiment of FIG. 1.

Unlike in the prior art, the drive units 22, 24 here do not transmit the values for the respective maximum torque relating to the assigned electric power, but a maximum torque independent of a power allocation. This maximum torque depends, inter alia, on the design of the drive units 22, 24, on current operating parameters such as temperature and/or the like. The vehicle control system 30 therefore receives the maximum values of the adjustable torques that are possible when sufficient power is available.

In the invention, computing units 38, 48 are therefore provided that form part of a vehicle control system 30 and obtain the value of the maximum available power 66 of the accumulator 26. Accordingly, a computing unit 32 is now provided which is configured to compute in addition a maximum value for a total torque based on the maximum available power 66 of the accumulator 26 when computing the total torque 44. The computing unit 32 1 thus takes into consideration, in addition to the computing unit 16 of FIG. 1, a maximum total torque provided by a computing unit 48.

The computing unit 48 calculates the maximum total torque by taking into account the maximum available power 66 of the electric energy storage device 26, i.e. based on the value for the maximum available power 66 transmitted by the accumulator 26.

The computing unit 32 computes—like the computing unit 16 in FIG. 1 maximum torques 28, 68—maximum values for target torques 34, 36 determined drive-unit-specific by the computing units 18, 20, whereby the sum formed by the drive-unit-specific target torques is limited by the maximum total torque. The target torques control the drive units 22, 24, which then provide the respectively desired torque accordingly.

The drive units 22, 24 thus correspond substantially to the drive units that have already been described with reference to FIG. 1. However, the drive units 22, 24 of the invention are set so that their respective values provided for the maximum adjustable torque 52, 50 are independent of a power allocation. In other words, the maximum adjustable torques 52, 50 are—in contrast to the prior art—the drive-unit-specific values which, for example, in the simplest case only constitute a constant value due to a drive unit structure.

In addition—also as in FIG. 1—the drive target torque 14 generated by with the pedal 12 is considered by the computing unit 32.

Unlike in the prior art, the torques are here not distributed equally, but may be varied according to the configuration of a desired driving dynamics.

Moreover, unlike in the prior art, the computing unit 38 is provided, which preferably also receives as an input value the value of the maximum available power 66 of the accumulator 26. In addition, the computing unit 38 obtains the values for the drive-unit-specific target torques 34, 36 for the respective drive units 22, 24, which are converted into corresponding powers. When the maximum available power 66 of the accumulator 26 is also taken into account, a resultant power reserve may be added proportionately, for example equally, to the respective values for the maximum power 40, 42. The computing unit 38 determines therefrom values for maximum powers 40, 42 for the respective drive units 22, 24, which are in turn transmitted to the drive units 22, 24.

Other parameters, for example converter-specific parameters, may be considered in the values for the maximum torques 28, 68, such as the inverter temperature, parameters of the respective connected electric machine and/or the like.

According to the present embodiment, for determining the converter-specific maximum. powers 40, 42, the computing unit 38 forms first the sum of the powers corresponding to the individual target torques 34, 36, thereafter a difference with respect to the value of the maximum available power 66 of the accumulator 26, and finally adds the difference equally to the respective converter-specific power. This value is then transmitted as a maximum power 40, 42 to the respective drive units 22, 24.

With the invention, not only is a fixed, equal adjustment for the drive units 22, 24 feasible when the maximum available power 66 changes, but also an appropriate weighting for the current driving conditions. This significantly improves the driving dynamics.

An essential difference to the prior art is that the drive units 22, 24 do not—as is customary in the prior art—take into account the allocated maximum power when generating the value for the maximum torque, but instead output the maximum torque 28, 68, which they are capable of producing due to their structural characteristics and other parameters, such as temperature or parameters of the connected electric machine. The computing units 18, 20 therefore generate not only in equal proportions a machine-specific target torque corresponding to half the maximum torque, but the computing unit 32 causes a corresponding distribution of the torques by taking into account the maximum available power 66 of the accumulator 26.

The exemplary embodiment is merely illustrative of the invention and is not limiting for the invention. It will be understood that both powers and torques can have positive and negative values.

In particular, the invention can be used during both acceleration and deceleration of the vehicle. If the voltage at the intermediate circuit is substantially constant, the respective current can be considered instead of the power.

The advantages, features, and embodiments described for the inventive method are equally applicable to the vehicle control system according to the invention and to a vehicle equipped with the vehicle controller vehicle. Consequently, corresponding device features can be provided for method features, and vice versa.

The invention claimed is:

1. A method for controlling a drive device of an at least partially electrically driven vehicle having at least two vehicle wheels which are each mechanically coupled to a respective electric drive unit, said method comprising:
   during motor operation, receiving with each electric drive unit electrical energy from an electrical energy storage device,
   during generator operation, supplying from each electric drive unit electric energy to the electrical energy storage device,
   providing with the electric drive units during normal operation to a vehicle control system a torque commensurate with a drive-unit-specific target torque for each electric drive unit,
   assigning by the vehicle control system to each of the electric drive units a maximum drive-unit-specific electric power under a proviso that a sum of the assigned maximum drive-unit-specific electric powers is limited by the maximum available power of the electric energy storage device,
   determining a maximum total torque by taking into account a maximum available power of the electrical energy storage device, and
   limiting a sum formed from the drive-unit-specific target torques by the maximum total torque.

2. The method of claim 1, wherein a maximum value for the drive-unit-specific target torque is adjusted when the maximum available power changes.

3. The method of claim 2, wherein the maximum value for the drive-unit-specific target torque is determined by taking into account an efficiency of an electric machine or of an inverter of the electric drive unit associated with the corresponding electric machine.

4. The method of claim 1, wherein the vehicle control system determines maximum values for the drive-unit-specific powers of the drive units by taking into account the drive-unit-specific target torques and transmits the maximum values to the drive units.

5. The method of claim 1, wherein the maximum available power is determined as a function of a state of charge or an aging state of the electric energy storage device.

6. A method for controlling a drive device of an at least partially electrically driven vehicle having at least two vehicle wheels which are each mechanically coupled to a respective electric drive unit, said method comprising:
   during motor operation, receiving with each electric drive unit electrical energy from an electrical energy storage device,
   during generator operation, supplying from each electric drive unit electric energy to the electrical energy storage device,
   providing with the electric drive units during normal operation to a vehicle control system a torque commensurate with a drive-unit-specific target torque for each electric drive unit,
   determining a maximum total torque by taking into account a maximum available power of the electrical energy storage device, and
   limiting a sum formed from the drive-unit-specific target torques by the maximum total torque,
   wherein for determining a maximum value for the drive-unit-specific target torque, the vehicle control system takes into account a power of an electrical component connected to the electric energy storage device.

7. The method of claim 6, wherein the electrical component is switched on or switched off for increasing the maximum available power.

8. The method of claim 6, wherein a maximum value for the drive-unit-specific target torque is adjusted when the maximum available power changes.

9. The method of claim 8, wherein the maximum value for the drive-unit-specific target torque is determined by taking into account an efficiency of an electric machine or of an inverter of the electric drive unit associated with the corresponding electric machine.

10. The method of claim 6, wherein the vehicle control system determines maximum values for the drive-unit-specific powers of the electric drive units by taking into account the drive-unit-specific target torques and transmits the maximum values to the electric drive units.

11. The method of claim 6, wherein the maximum available power is determined as a function of a state of charge or an aging state of the electric energy storage device.

12. A vehicle control system for controlling a drive device of an at least partially electrically driven vehicle having at least two vehicle wheels which are each mechanically coupled to a respective electric drive unit, comprising:
    at least one terminal for connecting the electric drive units, and
    a computing unit which is configured to
      provide in normal operation to each of the electric drive units during normal operation a drive-unit-specific target torque,
      determine a maximum total torque by taking into account a maximum available power of an electric energy storage device, and
      limit by way of the maximum total torque a sum formed of the drive-unit-specific target torques,
    wherein the vehicle control system assigns to each of the electric drive units a maximum drive-unit-specific electric power under a proviso that a sum of the assigned maximum drive-unit-specific electric powers is limited by the maximum available power of an electric energy storage device.

13. A vehicle, comprising:
a drive device with at least two vehicle wheels which are each mechanically coupled to a respective electric drive unit,
an electric energy storage device connected to the electric drive units for supplying electrical energy to the electric drive units during motor operation and for receiving electrical energy from the electric drive units during generator operation, and
a vehicle control system comprising a computing unit which is configured to
provide in normal operation to each of the electric drive units during normal operation a drive-unit-specific target torque,
determine a maximum total torque by taking into account a maximum available power of the electric energy storage device, and
limit by way of the maximum total torque a sum formed of the drive-unit-specific target torques,
wherein the vehicle control system assigns to each of the electric drive units a maximum drive-unit-specific electric power under a proviso that a sum of the assigned maximum drive-unit-specific electric powers is limited by the maximum available power of the electric energy storage device.

* * * * *